United States Patent [19]

Campbell, Jr. et al.

[11] 4,357,907

[45] Nov. 9, 1982

[54] FLUIDIZED BED COMBUSTOR WITH IMPROVED INDIRECT HEAT EXCHANGER UNITS

[75] Inventors: John Campbell, Jr., Woodland Hills; Larry H. Russell, Agoura; Philip I. Robinson, Calabasas, all of Calif.

[73] Assignee: Rockwell International Corporation, El Segundo, Calif.

[21] Appl. No.: 200,751

[22] Filed: Oct. 27, 1980

[51] Int. Cl.³ .......................... F22B 1/02; F23D 19/02
[52] U.S. Cl. .................................. 122/4 D; 122/510; 122/235 A
[58] Field of Search .................. 122/4 D, 510, 235 A; 110/245, 347

[56] References Cited

U.S. PATENT DOCUMENTS

| | | | |
|---|---|---|---|
| 2,931,711 | 4/1960 | Walker . | |
| 4,084,545 | 4/1978 | Nack et al. | 122/4 D |
| 4,116,005 | 9/1978 | Willyoung | 122/4 D |
| 4,183,330 | 1/1980 | Bryers et al. | 122/4 D |
| 4,184,455 | 1/1980 | Talmud et al. | 122/4 D |
| 4,211,186 | 7/1980 | Pearce | 122/4 D |
| 4,275,668 | 6/1981 | Daman | 122/4 D |
| 4,286,366 | 9/1981 | Vinyard | 122/510 |

FOREIGN PATENT DOCUMENTS 2034448 6/1980 United Kingdom ............... 122/4 D

*Primary Examiner*—Henry C. Yuen
*Attorney, Agent, or Firm*—H. Fredrick Hamann; Harry B. Field

[57] ABSTRACT

There is provided a fluidized bed combustor comprising an economizer contained in an upper interior portion and indirect heat exchange conduits suspended in the lower interior portion of the fluidized bed combustor in spaced relation to the interior surfaces of the fluidized bed combustor.

10 Claims, 4 Drawing Figures

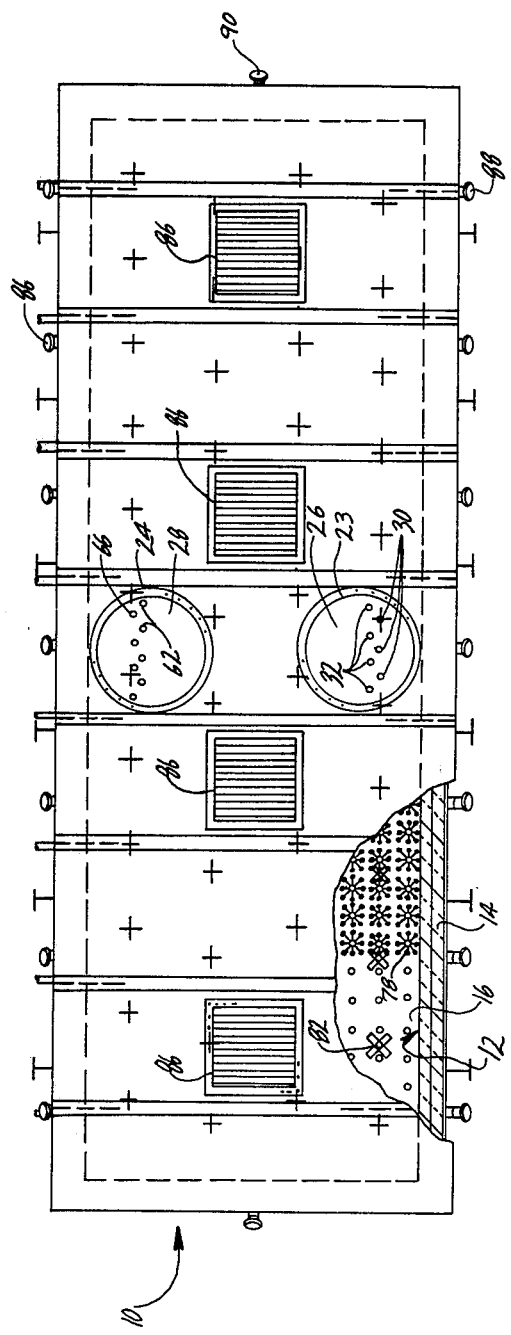

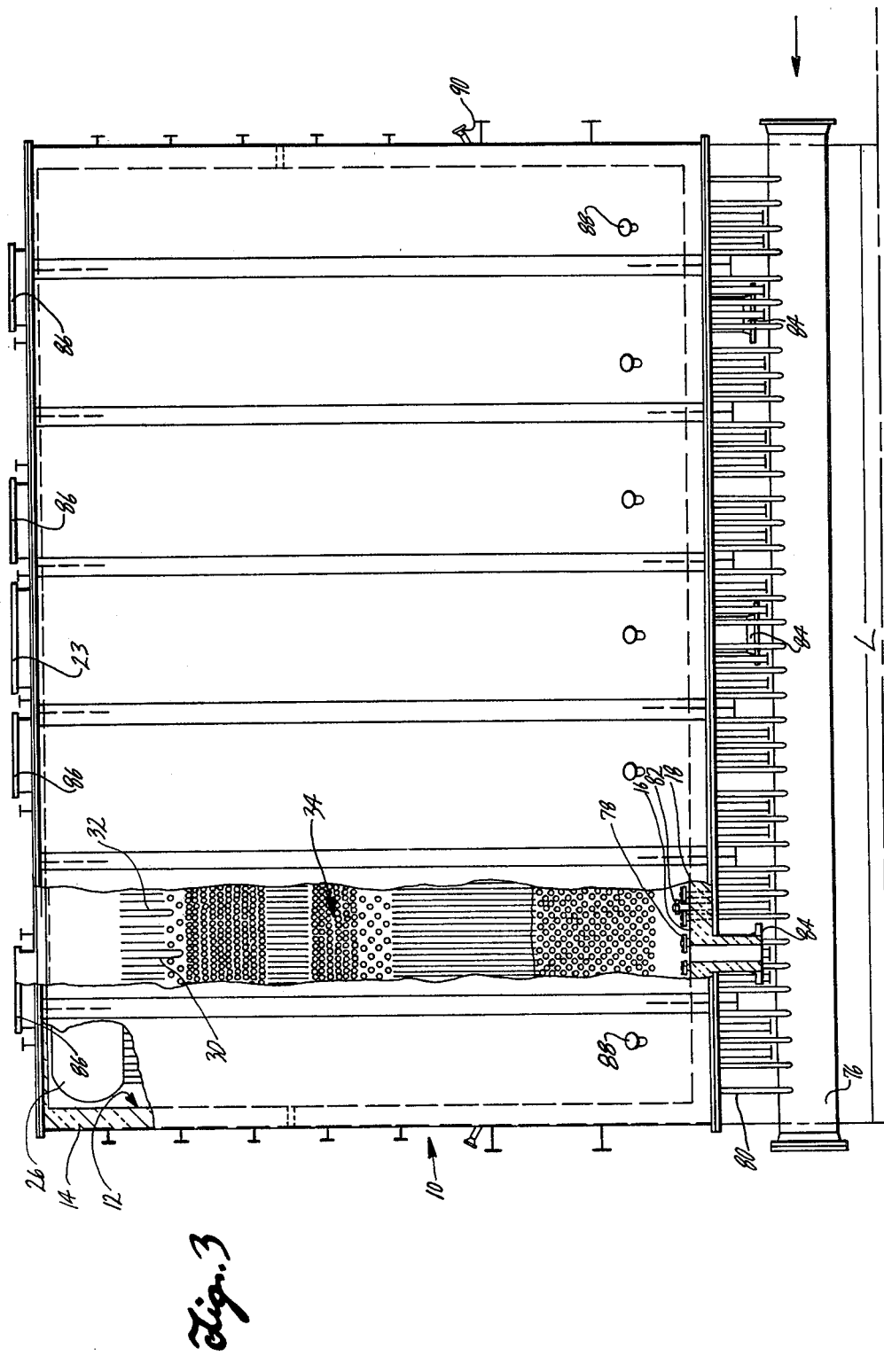

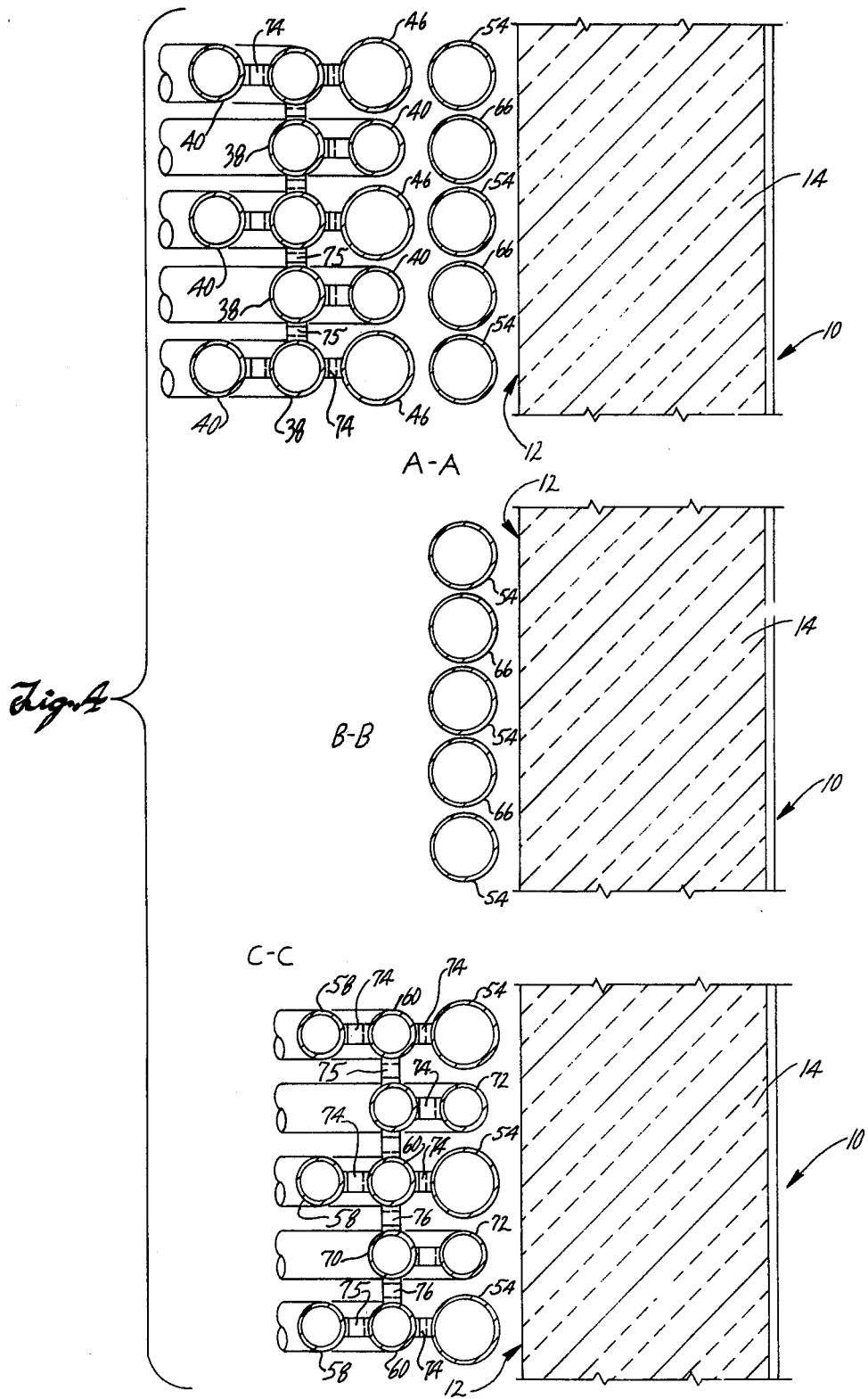

FLUIDIZED BED COMBUSTOR WITH IMPROVED INDIRECT HEAT EXCHANGER UNITS

BACKGROUND OF THE INVENTION

It has been proposed to utilize atmospheric fluidized bed combustors for heating a working fluid in closed-cycle gas turbine power generation systems. They can be readily used to provide a working fluid, e.g., air, at temperatures up to about 1500° by passage of the fluid through tubes contained in a fluidized bed combustion zone operated at 1600° to 1700° F.

The high-temperature medium contained in the fluidized bed is normally generated by combustion of a sulfur-containing particulate carbonaceous fuel such as sulfur-containing coal. It is abrasive and corrosive. Corrosive conditions exist, in part, due to sulfur dioxide generated as a consequence of combustion, and, in part, by the existence of zones of reducing atmosphere. Reducing atmosphere zones form in crevices where heat exchange tubes pass through the side walls of the fluidized bed enclosure. There, fluids stagnate and become more corrosive than the dynamic zones within the fluidized bed. There exists, therefore, a need to provide fluidized bed combustors where corrosion problems due to fluid stagnation are eliminated.

SUMMARY OF THE INVENTION

There is provided, in accordance with the present invention, a fluidized bed combustor which eliminates the problems existing in prior art fluidized bed combustors by suspending the tubes present in the fluidized bed of the combustor from an upper zone of lower temperature in a manner which eliminates contact with the interior surfaces of the fluidized combustor to prevent stagnant conditions from forming within the fluidized bed combustion zone.

A fluidized bed combustor provided in accordance with the invention comprises an insulated combustion chamber having an upper interior portion, a lower interior portion, and including an interior surface. The lower interior portion is provided to contain a fluidized bed of combustible particulate carbonaceous fuel. A fluid inlet means extends from the exterior of the combustion chamber into the upper interior portion of said combustion chamber and a fluid outlet means extends from the upper interior portion of the combustion chamber to its exterior.

A first plurality of indirect heat exchange conduits, forming an economizer, is coupled in flow communication with said fluid inlet means. A second plurality of indirect heat exchange conduits are suspended from the upper portion of the combustion chamber and contained within the lower portion of said combustion chamber in spaced relation to the interior surface and coupled in flow communication with the first indirect heat exchange conduits and the fluid outlet means. There is also provided means to introduce a particulate carbonaceous fuel to the lower portion of the combustion chamber and means to introduce air to said lower portion of said combustion chamber to sustain combustion in the fluidized bed.

The fluidized bed combustor includes a removable lid, and the fluid inlet means preferably comprises a fluid inlet conduit extending from the lid downwards into the upper interior portion of the combustion chamber. The fluid inlet is coupled in flow communication to a fluid inlet manifold extending laterally of the combustion chamber and within the confines thereof. The fluid inlet manifold is preferably supported by the fluid inlet conduit, and is adjacent the interior surface of the combustion chamber. A fluid outlet means preferably comprises a fluid outlet conduit which extends from within the combustion chamber at least to the removable lid. The fluid outlet conduit is coupled to and preferably supports a fluid outlet manifold which extends laterally of the combustion chamber and contained within the upper portion thereof. It is preferred that the outlet manifold is positioned along a surface opposite the inlet manifold.

It is preferred to employ at least one intermediate manifold also contained in the upper interior portion of the combustion chamber and extending longitudinally of the combustion chamber, and preferably adjacent an interior surface of the combustion chamber to couple the indirect heat exchange conduits contained in the lower and upper interior portions of the combustion chamber. The indirect heat exchange conduits are preferably tubular and of serpentine configuration.

In the most preferred construction, a second intermediate manifold extends along an interior surface of the combustor opposite the first intermediate manifold. Heat exchange conduits extend therefrom to the inlet and outlet fluid flow manifolds. Running transverse of the combustor, alternate exchange conduits are coupled in "flip-flop" arrangement to the first and second intermediate manifolds. This provides downcomers adjacent two opposed surfaces of the combustor and enhances the use of lateral cross supports to increase the structural rigidity and strength of the total assembly.

The heat exchanger units, including the fluid flow heat exchange conduits of the bed and the economizer, are suspended in the combustion chamber. It is preferred that all connections to the heat exchange conduits, or tube bundles, be by way of the lid. Other connection arrangements are also possible, so long as they are contained in the relatively low-temperature upper interior portion of the combustion chamber. Whichever the arrangement employed, the downcomers, risers, and tube bundles are spaced from the interior surface of the fluidized bed combustor.

In a preferred embodiment, risers of the economizer and downcomers and risers of the fluidized bed tube bundles form part of the structural support for the heat exchange conduits. In this arrangement, individual tubes are secured to each other and/or to risers and downcomers, in spaced relation, to form a "three-dimensional" structural network, which does not interfere with fluid flow within the fluidized bed. Tube circuits are preferably alternately opposite in flow direction to permit every downcomer to serve a support function. The resulting assembly forms a unitary core in which the components are interconnected, and which allows for differential thermal growth and freedom of circulation of the solids of the bed over the surfaces, but which eliminates all penetration of the walls of the lower interior portion of the combustion chamber and preferably the upper interior portion of the combustion chamber as well.

THE DRAWINGS

FIGS. 2 and 3 are respectively top and side views illustrating some elements of the construction.

FIG. 4 is a detailed illustration of the tube arrangements with reference to cuts A—A, B—B, and C—C of FIG. 1.

DETAILED DESCRIPTION

Figure 1:
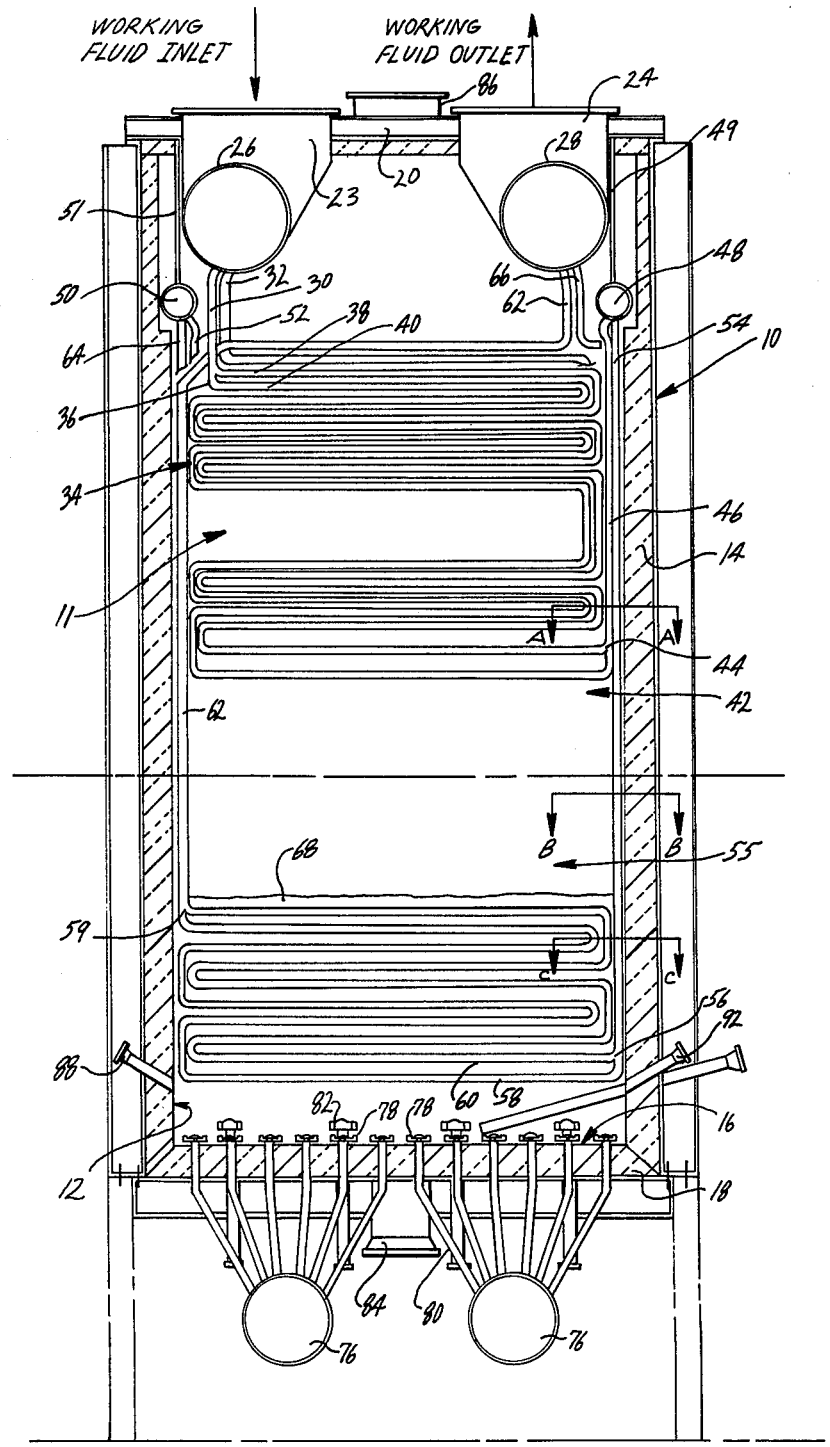
FIG. 1 is an end view of the preferred fluidized bed structure of the instant invention.

With reference to FIGS. 1, 2, 3, and 4, the fluidized bed combustor of this invention 10 consists of an insulated combustion chamber 11, and includes an interior surface formed, for the configuration shown, of interior sides 12, formed in part by an insulating material 14 and an interior base 16, formed in part by an insulating material 18, and a removable insulated lid 20. A portion of the insulation is sectioned out at 22 to accommodate the drop-in heat exchange unit formed by the lid 20 and units attached thereto.

Basic to the heat exchange units are a working fluid inlet 23 and working fluid outlet 24 which preferably extend downwards through lid 20. Preferably, working fluid inlet 23 and working fluid outlet 24 are respectively coupled in supporting relationship to lateral fluid inlet manifold 26 and lateral fluid outlet manifold 28, which extend adjacent the interior sides 12 of the combustion chamber, each respectively normal to the working fluid inlet 23 and outlet 24.

Extending from fluid inlet manifold 26 are a plurality of fluid flow downcomers 30 and 32, which serve alternate transverse heat exchange conduits of the economizer tube bundle 34. Downcomer 30 and the tubes attached thereto are shown in detail. Downcomer 30 bifurcates at its functional end 36 and couples to serpentine tubes 38 and 40 and, after winding trasversely through the upper portion 42 of the combustion chamber to form a portion of economizer tube bundle, rejoin at bifurcated joint 44 to riser 46 coupled to intermediate manifold 48, which is secured to lid 20 by hanger 49. The working fluid, e.g., air, to the extent it is heated in economizer zone 34, is collected in intermediate manifolds 48 and 50. Intermediate manifold 50 is secured to lid 20 by hanger 51 and is serviced by risers 52. Riser 52 is coupled to serpentine tubes, which are in turn coupled to fluid inlet manifold 26 by downcomer 32. Downcomer 54 extends from intermediate manifold 48 into the lower portion 55 of the chamber. Downcomer 54 is a supporting fluid flow conduit, which splits at bifurcated joint 56 to service transverse serpentine tubes 58 and 60. Tubes 58 and 60 recombine at bifurcated joint 59 and by riser 62, extend and couple in flow communication to outlet manifold 28. Tubes of lateral alternate rows are served by downcomers 64 and flow returned by risers 66. Tubes 58 and 60, as well as portions of the coupling risers and downcomers, are contained in fluidized bed 68.

With reference to FIGS. 1 to 4, there are illustrated sections of the economizer and fluidized bed tube bundles showing structural interrelationships which aid in providing lateral and vertical support to the tubes and permit both tube bundles to be removed as a unit from the combustion chamber.

With reference now to FIGS. 1 and 4, as can be seen from cuts A—A, B—B and C—C, that the tubes, risers, and downcomers are spaced from the interior surface 12 of the combustion chamber. With reference to section A—A, downcomers 54 extend from intermediate manifold 48 and couple to the tube bundle contained in the lower portion 55 of the combustion chamber, which contains fluidized bed 68. Risers 66 are from the alternate tube bundles passing to manifold 28. Risers 46 are coupled to imtermediate manifold 48. Tubes 38 and 40 are serpentine tubes of the economizer tube bundle. Spacers 74 provide lateral and vertical supports between tubes 40 and 38. Spacers 75 provide lateral and vertical support between tubes 38 and 40 of alternate rows of first indirect heat exchange conduits.

With reference to cut C—C, tubes 54 are the downcomers from intermediate manifold 48 which bifurcate into tubes 58 and 60. Corresponding tubes of adjacent tube rows are 70 and 72, which originate form downcomer 64 and terminate in riser 66 coupled to fluid outlet manifold 28.

Across both the length and width of the tube bundles contained within the fluidized bed are tube spacer supports 74 and 75. Downcomers 54 and 64 serve as primary vertical supports for the tubes of the fluidized bed bundles. The tube support spacers 74 are secured to downcomers 54 and transversely to tubes 60 which are in turn secured to tubes 58. Tubes 70 and 72 are likewise transversely secured to downcomers 64 (not shown). Lateral spacers 75 secure tubes 60 to tubes 70 and, at the opposed surface (not shown), tubes 58 to tubes 72. The use of transverse and lateral spacers within each bundle provides a semi-rigid assembly having a minimum of interference to fluid flow.

What is provided, in accordance with the structure of the instant invention, is a heat exchange tube bundle assembly which can be removed as a unit from the fluidized bed combustion chamber for inspection, cleaning, and repair, and one having sufficient rigidity to avoid unnecessary tube vibration during operation. What is eliminated are the static zones which create areas of accelerated corrosion in the high-temperature sections of the fluidized bed.

In the construction, while heat exchange conduits of the economizer can be directly coupled in flow relation to the tubes of the fluidized bed, they are preferably indirectly coupled through intermediate manifolds 48 and 50. The intermediate manifolds provide better mixing at zones of intermediate heating, and enable the use of a dirrerent number of tubes in the economizer than in the fluidized bed without creating fabrication problems.

Remaining elements of the fluidized bed combustor include air inlet manifolds 76 which supply combustion air to tuyeres 78 by conduits 80.

Particulate carbonaceous material, e.g., coal, and if desired limestone or the like, for control of sulfur, are provided by fuel inlets 82 while the solids resulting from combustion may be removed by drains 84 and the gaseous products of combustion by outlets 86. Combustion may be facilitated by the use of inbed burners 88 and pilot burners 90 positioned along the walls of the combustor as shown. Tube 92 serves as a means to feed solids to the bed during startup and to control bed height.

In use, fluidized bed 68 is maintained by feed of a particulate carbonáceous material through inlets 82 and the feed of air through tuyeres 78, the volume of air introduced being sufficient to maintain the bed in the fluidized state and bed temperature in the range of 1600° to 1700° F. The working fluid to undergo heating, e.g., air, is introduced typically at a temperature of 500°-600° F. to working fluid inlet 23 and is distributed by manifold 26 to the tubes forming the economizer 34 and from the economizer 34 to intermediate manifolds 48 and 50. The fluid is then passed, at an intermediate temperature, to the tubes in fluidized bed 68 where it is heated to a final working temperature of approximately 1500° to 1550° F., and passed by risers 62 and 66 to manifold 28 and exits by working fluid outlet 24.

By use of the fluidized bed combustor of the instant invention, fluid flow conduit penetrations of the side walls may be eliminated, and are eliminated in the high-temperature zone of the fluidized bed. This eliminates abnormal metal corrosion problems, enhances refractory durability, and simplified casing construction. The fluid to undergo final heating is passed by downcomers to the base of the bed at a temperature which, on a relative basis, is low. This enhances the use of downcomers as supports and minimizes corrosion problems due to maldistribution of reactants near the points of injection.

Because the downcomers are cooler, they are at a higher strength level for use as primary supports for the tube bundle contained in the fluidized bed. By being suspended from lid 20, the tube bundles enjoy free downwards expansion and the ability to be removed from the top for service and repair. Locating the manifolds and the exhausts above the combustion zone avoids contact with the hottest gases of combustion while still permitting full freedom of expansion.

While the preferred fluidized bed combustor is illustrated as having a rectangular cross-section, a unit of square, circular or annular cross-section may also be employed.

It is understood that what has been described is merely illustrative of the principles of the invention and that numerous arrangements in accordance with this invention may be devised by one skilled in the art without departing from the spirit and scope thereof.

What is claimed is:

1. A fluidized bed combustor comprising:
  (a) an insulated combustion chamber comprising an upper interior portion and a lower interior portion and having an interior surface and a removable lid, said lower interior portion for containing a fluidized bed of combustible particulate carbonaceous fuel;
  (b) a fluid inlet conduit extending from at least the lid downwards into said upper interior portion of the combustion chamber;
  (c) a fluid inlet manifold contained within the upper interior portion of and adjacent the interior surface of the combustion chamber, said fluid inlet manifold secured to and in flow communication with said fluid inlet conduit;
  (d) a fluid outlet conduit extending from within the upper interior portion of the combustion chamber at least to said lid;
  (e) a fluid outlet manifold contained within the upper interior portion of and adjacent the interior surface of the combustion chamber, said fluid outlet manifold secured to and in flow communication with said fluid outlet conduit;
  (f) a first intermediate manifold secured to the lid and contained in the upper interior portion of the combustion chamber adjacent the interior surface thereof and substantially parallel to said inlet and outlet manifolds;
  (g) a second intermediate manifold secured to the lid and contained in the upper interior portion of the combustion chamber adjacent the interior surface thereof and positioned substantially parallel to said inlet and outlet manifolds;
  (h) an economizer contained in the upper interior portion of said combustion chamber and formed of a plurality of first indirect heat exchange conduits and second indirect heat exchange conduits alternately spaced from the first indirect heat exchange conduits in substantially parallel relation, said first indirect heat exchange conduits coupled in flow relation to said fluid inlet manifold and said first intermediate manifold, said second indirect heat exchange conduits coupled in flow relation to said fluid inlet manifold and said second intermediate manifold;
  (i) a plurality of first downcomers coupled in flow relationship to and extending downwards from said first intermediate manifold adjacent the interior surface of the combustion chamber and into the lower interior portion thereof;
  (j) a plurality of second downcomers coupled in flow relationship to and extending downwards from said second intermediate manifold adjacent the interior surface of the combustion chamber and into the lower interior portion thereof;
  (k) a plurality of third indirect heat exchange conduits alternatively spaced from a plurality of fourth indirect heat exchange conduits in substantially parallel relation, the third and fourth heat exchange conduits suspended within the lower interior portion of said combustion chamber in spaced relation to the interior surface thereof, the third heat exchange conduits coupled in flow communication to said first downcomers and by first risers to said fluid outlet manifold, said fourth heat exchange conduits coupled in flow communication with said second downcomers and by second risers to said fluid outlet manifold;
  (l) means for introducing a particulate carbonaceous fuel to said lower interior portion of the combustion chamber;
  (m) means for introducing air to said lower interior portion of said combustion chamber.

2. A fluidized bed combustor as claimed in claim 1 in which the first and second indirect heat transfer conduits forming the economizer and said third and fourth indirect heat transfer conduits contained in the lower interior portion of the combustion chamber are tubes of serpentine configuration.

3. A fluidized bed combustor as claimed in claim 1 in which the third indirect heat exchange conduits are serpentine tubes coupled to the first downcomers and first risers in bifurcated flow relation and in which the fourth indirect heat exchange conduits are serpentine tubes coupled to the second downcomers and second risers in bifurcated flow relation.

4. A fluidized bed combustor as claimed in claim 3 in which each of the first indirect heat exchange conduits comprises a downcomer extending from and coupled at one end in flow communication to said fluid inlet manifold and at an opposed end in bifurcated flow relation to a pair of serpentine tubes coupled in bifurcated flow relation to a riser coupled in flow relation to the first intermediate manifold and in which each of the second indirect heat exchange conduits comprises a downcomer extending from and coupled at one end in flow communication to said fluid inlet manifold and at an opposed end in bifurcated flow relation to a pair of serpentine tubes coupled in bifurcated flow relation to a riser coupled in flow relation to the second intermediate manifold.

5. A fluidized bed combustor as claimed in claim 3 in which the downcomers of the third and fourth indirect heat exchange conduits are secured in transverse supporting spaced relation to the respective serpentine tubes thereof and in which the serpentine tubes of the third and fourth indirect heat exchange conduits are mutually coupled in lateral supporting spaced relation.

6. A fluidized bed combustor as claimed in claim 4 in which the downcomers of the third and fourth indirect heat exchange conduits are secured in transverse supporting spaced relation to the respective serpentine tubes thereof and in which the serpentine tubes of the third and fourth indirect heat exchange conduits are mutually coupled in lateral supporting spaced relation.

7. A fluidized bed combustor as claimed in claim 5 in which the risers of the first and second indirect heat exchange conduits are secured in transverse supporting spaced relation to the respective serpentine tubes thereof and the serpentine tubes of the first and second heat exchange conduits are mutually coupled in lateral supporting spaced relation.

8. A fluidized bed combustor as claimed in claim 7 in which serpentine tubes of the first indirect heat exchange conduit are coupled in transverse supporting spaced relation to risers of the third indirect heat exchange conduit and in which the serpentine tubes of the second indirect heat exchange conduits are coupled in transverse supporting spaced relation to risers of the fourth indirect heat exchange conduits.

9. A fluidized bed combustor as claimed in claim 6 in which the risers of the first and second indirect heat exchange conduits are secured in transverse supporting spaced relation to the respective serpentine tubes thereof and the serpentine tubes of the first and second heat exchange conduits are mutually coupled in lateral supporting spaced relation.

10. A fluidized bed combustor as claimed in claim 9 in which serpentine tubes of the first indirect heat exchange conduit are coupled in transverse supporting spaced relation to risers of the third indirect heat exchange conduit and in which the serpentine tubes of the second indirect heat exchange conduits are coupled in transverse supporting spaced relation to risers of the fourth indirect heat exchange conduits.

* * * * *